United States Patent
Zhang et al.

(10) Patent No.: US 10,389,786 B1
(45) Date of Patent: Aug. 20, 2019

(54) OUTPUT TRACKING FOR PROTECTED CONTENT-STREAM PORTIONS

(71) Applicant: Amazon Technologies, Inc., Seattle, WA (US)

(72) Inventors: Alex Xiaoye Zhang, Seattle, WA (US); Matthew Brinkley, Portland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 15/282,929

(22) Filed: Sep. 30, 2016

(51) Int. Cl.
  H04L 29/06 (2006.01)
  H04L 29/08 (2006.01)
  G06Q 30/02 (2012.01)
  H04N 21/81 (2011.01)
  H04N 21/488 (2011.01)

(52) U.S. Cl.
  CPC .......... H04L 65/604 (2013.01); H04L 67/26 (2013.01); *G06Q 30/0257* (2013.01); *H04N 21/4882* (2013.01); *H04N 21/812* (2013.01); *H04N 21/8126* (2013.01)

(58) Field of Classification Search
  CPC ... H04L 65/604; H04L 67/26; H04N 21/8126; H04N 21/4882; H04N 21/812; G06Q 30/0257
  USPC ........................................................ 709/219
  See application file for complete search history.

(56) References Cited

U.S. PATENT DOCUMENTS

| | | | |
|---|---|---|---|
| 2003/0061278 A1* | 3/2003 | Agarwalla | G06F 17/30902 709/203 |
| 2004/0243466 A1* | 12/2004 | Trzybinski | G06Q 30/02 705/14.55 |
| 2005/0195899 A1* | 9/2005 | Han | H04N 21/234327 375/240.21 |
| 2007/0112938 A1* | 5/2007 | Belimpasakis | H04L 29/08846 709/219 |
| 2007/0261073 A1* | 11/2007 | Blumenschein | H04H 20/14 725/19 |
| 2008/0193104 A1* | 8/2008 | Hasek | H04N 5/783 386/291 |
| 2010/0058061 A1* | 3/2010 | Folta | G06F 21/14 713/171 |

(Continued)

*Primary Examiner* — David R Lazaro
*Assistant Examiner* — Berhanu Shitayewoldetadik
(74) *Attorney, Agent, or Firm* — Knobbe, Martens, Olson & Bear, LLP

(57) ABSTRACT

Systems and methods are described to enable delivery of a content stream while inhibiting or preventing removal, blocking, or skipping of portions within that content stream. Existing systems can request that a client device send various notifications during viewing of a streaming content. This information can be used by the client device to automatically remove or modify secondary content from the content stream. To prevent such removal or modification, embodiments of the present disclosure can remove the requirement that a client device have knowledge of when notifications are to be transmitted regarding portions of a content stream. A server can obtain monitoring information from either or both of a client device or a network-delivery system, to determine when the client device has output a portion of a content stream. The server can then determine an appropriate notification to be transmitted in response to that output, and transmit the notification.

19 Claims, 8 Drawing Sheets

(56) References Cited

U.S. PATENT DOCUMENTS

| | | | | |
|---|---|---|---|---|
| 2010/0153990 | A1* | 6/2010 | Ress | G06Q 30/02 |
| | | | | 725/34 |
| 2010/0198982 | A1* | 8/2010 | Fernandez | G06Q 30/02 |
| | | | | 709/231 |
| 2010/0333154 | A1* | 12/2010 | Dasher | H04N 21/235 |
| | | | | 725/98 |
| 2011/0072075 | A1* | 3/2011 | Gautier | H04L 12/1881 |
| | | | | 709/203 |
| 2012/0072608 | A1* | 3/2012 | Peters | H04L 65/4084 |
| | | | | 709/231 |
| 2012/0179786 | A1* | 7/2012 | Nandagopal | H04L 65/604 |
| | | | | 709/219 |
| 2012/0254321 | A1* | 10/2012 | Lindsay | G06Q 10/107 |
| | | | | 709/206 |
| 2014/0156363 | A1* | 6/2014 | Hsu | G06Q 30/0241 |
| | | | | 705/14.4 |
| 2014/0270705 | A1* | 9/2014 | Solonsky | H04N 19/176 |
| | | | | 386/252 |
| 2014/0359075 | A1* | 12/2014 | Amidei | H04L 65/607 |
| | | | | 709/219 |
| 2015/0212675 | A1* | 7/2015 | Firstenberg | G06F 3/0484 |
| | | | | 715/747 |
| 2015/0215571 | A1* | 7/2015 | Greene | H04N 5/765 |
| | | | | 386/326 |
| 2015/0334431 | A1* | 11/2015 | Bjordammen | H04N 21/2625 |
| | | | | 725/32 |
| 2016/0127755 | A1* | 5/2016 | Woods | H04N 21/2665 |
| | | | | 725/19 |
| 2016/0198202 | A1* | 7/2016 | Van Brandenburg | |
| | | | | H04N 21/26258 |
| | | | | 725/31 |
| 2016/0330258 | A1* | 11/2016 | Sandhu | H04L 65/1069 |
| 2016/0337680 | A1* | 11/2016 | Kalagi | H04N 21/2662 |

* cited by examiner

OUTPUT TRACKING FOR PROTECTED CONTENT-STREAM PORTIONS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ a series of interconnected data centers to deliver content (such as web sites, web content, or other digital data) to users or clients. These interconnected data centers are sometimes referred to as "content delivery networks" (CDNs) or streaming content delivery systems. Existing routing and addressing technologies can enable multiple data centers associated with a streaming content delivery system to provide similar or identical content to client computing devices. In some instances, each data center providing a set of content may be referred to as a point-of-presence ("POP"). A streaming content delivery system can maintain POPs over a wide area (or worldwide) to enable the system to efficiently service requests from clients in a variety of locations.

CDNs can be utilized to distribute wide varieties of content, and in some instances may serve to replicate or replace prior content distribution systems. For example, CDNs can provide network-based streaming video or audio content in a manner similar to traditional television or radio networks. This content is sometimes referred to as "internet television" or "internet radio," respectively. The streaming content can typically be viewed by dedicated computing devices (e.g., set top boxes), dedicated viewers on client computing devices (e.g., software applications), or non-dedicated software applications (e.g., web browsers). Often, these viewers provide functionality greater than the functionality available on traditional distribution networks, like television or radio, such as the availability to play content "on-demand." Moreover, these viewers often provide a high level of control to an end user, enabling the user to modify viewed content, such as to remove advertisements or other undesirable portions, often without the knowledge of the content provider or distribution network. In some instances, these modifications cause false information to be provided to content providers, such as an indication that an advertisement was viewed when in fact it was blocked.

DETAILED DESCRIPTION

Figure 1:
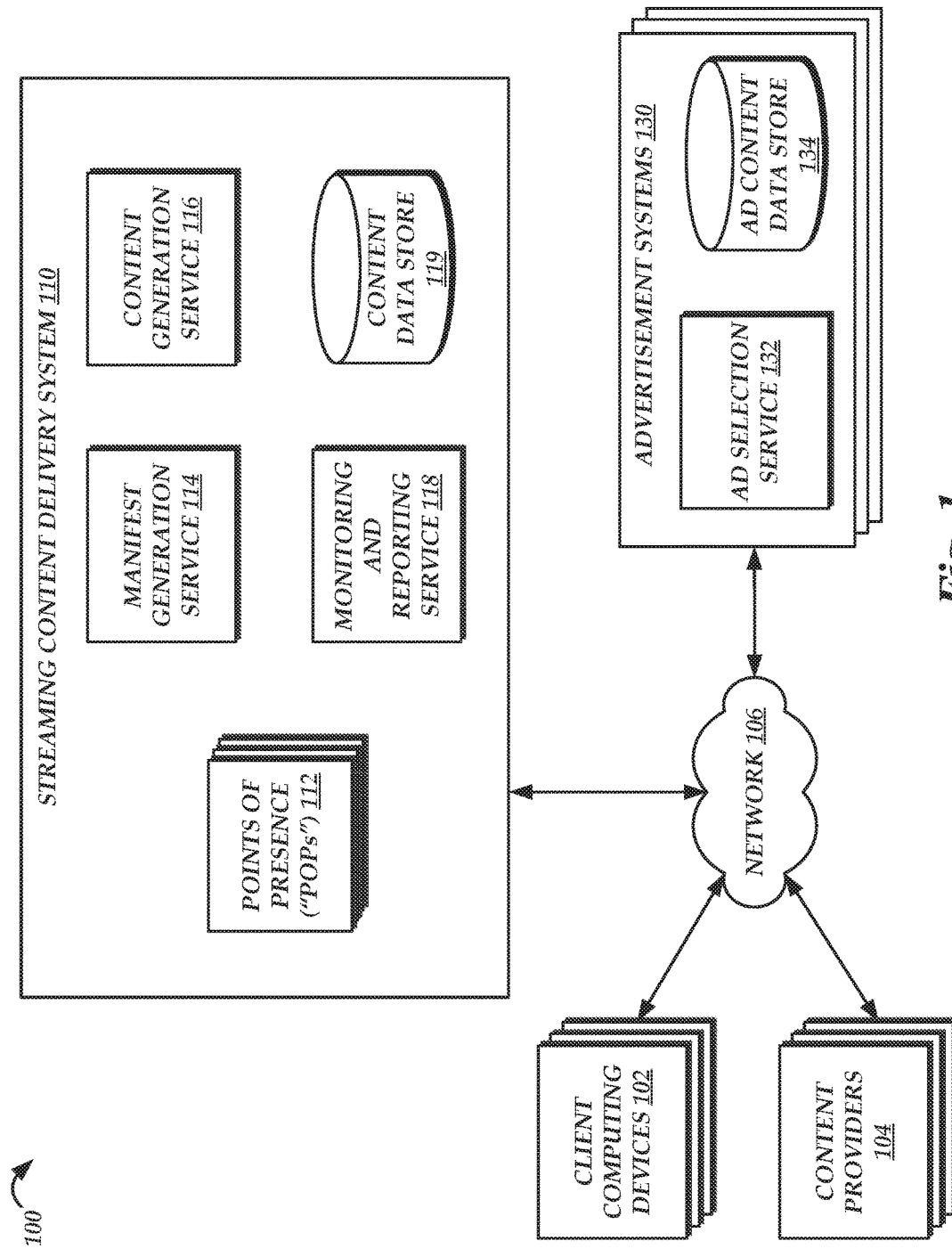
FIG. 1 is a block diagram depicting an illustrative logical network environment including client computing devices, content providers, and advertisement systems, as well as a streaming content delivery system configured to stream content to the client computing devices, process monitoring information regarding those protected portions, and notify providers regarding output of the portions on client computing devices.

Generally described, the present disclosure relates to providing streaming content over a communication network, monitoring output of that streaming content, and notifying providers of the streaming content regarding that output in a manner that does not require client computing devices to directly notify providers of content output, or have knowledge of when such notifications should occur. Illustratively, aspects of the present disclosure can enable reporting of when client computing devices output portions of streaming content, even when those portions are provided in a manner that inhibits client computing devices from programmatically distinguishing between different content portions. For example, one embodiment of the present disclosure can enable reporting of when client computing devices output protected content portions, such as disclaimers, legal warnings, or advertisements, without requiring (or in some instances while inhibiting) client computing devices from programmatically distinguishing between protected content portions and other portions, such as main content. As discussed below, embodiments of the present disclosure can utilize a server, distinct from the client computing device, to maintain a mapping between individual content portions, as seen by a client computing device, and corresponding notifications regarding those content portions (if any). Thereafter, a client computing device can report monitoring information to the server regarding viewed content portions. The server, in turn, can determine what notifications, if any, should be made regarding viewed content portions, and transmit such notifications, for example, to providers of the content. In this manner, client computing devices can be kept uninformed of what, if any, notifications would occur when viewing streaming content. This lack of information can inhibit, for example, client computing devices from removing or altering protected content portions.

As described herein, streaming content generally refers to any content that is divided into portions (sometimes referred to as "chunks") that may be transmitted and viewed independently, such that a client may begin to watch a first portion while downloading a second. The various portions of streaming content are often identified within one or more manifests, which provide metadata regarding the streaming content as well as a list of portions within the content. Each portion may be identified within the manifest based on a resource identifier (such as a uniform resource indicator, or "URI") or file name, which a client computing device may use to obtain and output the portions. In some instances, client computing devices may utilize information regarding the portions to selectively block or filter unwanted content, such as legal warning and notifications, credits, dedications, or advertisements. Devices or software that block such content are sometimes referred to as "ad blockers." Ad blockers often function by monitoring manifests for information that designates specific resources as unwanted content. For example, ad blockers may attempt to identify unwanted content by detecting an association between a content portion and a notification to be sent when the portion is viewed (e.g., to notify a provider that a legal disclaimer, advertisement, etc., has been viewed). As another example, ad blockers may attempt to identify unwanted content by the specific resource indicators (such as those including certain words within a file name or indicating certain domain names within an identifier). After identifying unwanted content, ad blocks may remove those portions from the manifest file or otherwise prevent the client computing device from displaying the portion. These modifications prevent clients from viewing important content and can have a detrimental effect on content providers (e.g., by reducing the effectiveness of legal warnings, reducing advertising revenue of the content provider, etc.). Accordingly, embodiments of the present disclosure relate to a streaming content delivery system that utilizes "back-end" notifications, such that a client computing device can report viewing information to a server within the streaming content delivery system, and that server in turn may determine what (if any) notifications should be transmitted in response to the viewing information. Thus, embodiments of this disclosure can enable transmission of notifications for streaming content without transmission of notification information to a client computing device, such that ad blockers or other client applications are not enabled to use notification information as a mechanism for identifying unwanted content.

As an illustrative example, assume a client computing device requests streaming content from the streaming content delivery system, which includes twenty-five minutes of television programming and three minutes of an advertisement. A typical manifest file may identify each portion of the television programming in discrete 10 second portions according to a first naming scheme or convention (e.g., "television1.ts," "television2.ts," etc.), and may similarly identify each 10 second portion of the advertisement according to a second naming scheme or convention ("advertisement1.ts," advertisement2.ts,"), etc. The manifest may additionally indicate that, after playback of one or more of the advertisement portions, the client computing devices should transmit a notification to a server associated with a provider of the advertisement. Illustratively, the notification may be in the form of a hypertext transport protocol (HTTP) request transmitted from the client computing device to the server, which includes identifying information of the client computing device and the portion output. Under normal operation, a client computing device would retrieve each portion using the identifier in the manifest, output the portions, and, on viewing of a portion associated with a notification, transmit the appropriate notification. However, if a client computing device utilized an ad blocker, it would be relatively trivial for the client computing device to modify the manifest file to remove the advertisement, by removing all references to files associated with notifications. In accordance with aspects of the present disclosure, a streaming content delivery system may, instead of providing notification information to a client computing device, maintain mapping information between content portions and associated notifications on the streaming content delivery system. The streaming content delivery system may further request or otherwise configure the client computing device to report output information for each viewed portion (e.g., by inclusion of client-side scripting in a display page for the content, by inclusion of executable code in a viewer for the content, etc.). On receiving the information from a client computing device, the streaming content delivery system can determine what notifications, if any, should be made regarding the viewed portions. Thus, client computing devices may be enabled to stream content, but prevented from automatically blocking or altering portions of the content based on notification information associated with the content.

To enable "back-end" notifications (e.g., generated at the streaming content delivery system, rather than the client computing device), the streaming content delivery system can include a monitoring and reporting service, which maintains information associating content portions viewable by the client computing device and the notifications that should be made when such content portions are viewed. The monitoring and reporting service may generate that information, for example, based on instructions received from third party services, such as advertisements networks. Illustratively, when a client computing device requests to view a main content (such as a television program, movie, etc.), the streaming content delivery system may transmit a notification to an advertisements network that advertisements can be included in a content stream for the main content. The advertisements network may respond with instructions to include specific advertising content in the main stream, as well as what notifications should be made during viewing of that advertising content. For example, the advertisements network may instruct that notifications should be transmitted after the client computing device has output each quartile (e.g., each 25%) of the advertising content, and may provide identifying information for those notifications. Identifying information may include, for example, a distinct uniform resource identifier (URI) to which an HTTP request should be transmitted to notify the advertisements network that a client computing device has viewed a portion of the advertisement. Illustratively, a URI for a user 'X' viewing the first quartile of an advertisement 'Y' may take the form of "http://ads.tld/?id=userXadYquartile1." As a further illustration, the URI may take the form of "http://ads.tld/?id=12345," where identifier "12345" is associated with user 'X' and advertisement 'Y.' When the monitoring and reporting service receives a notification that a content portion has been viewed at a client computing device, it may determine what, if any, notification information is associated with that viewed content portion, and transmit a notification as appropriate. Thus, notifications for content may be generated on-the-fly, on a per-user, per-session basis, without requiring that a client computing device be provided any notification information that may enable the device to distinguish between content types.

In some instances, the streaming content delivery system may further facilitate notifications for content portions by re-encoding content to match notification information for the content. For example, when streaming content includes one minute of advertising content in a content stream, and an advertisement system has requested that notifications be transmitted at each quartile of the advertising content, the streaming content delivery system may encode the advertising content into 15 second portions, such that notifications can be transmitted as each 15 second portion (representing a quartile of the one minute advertising content) is viewed. Re-encoding content may, for example, reduce inaccuracies caused when an advertisements system requests notifications for client viewing at a first granularity, but when monitoring information is obtained at a second granularity (e.g., at the level of individual content portions that do not begin and end at the points in time for requested notifications).

While examples are provided herein with respect to content distribution systems, embodiments of the present disclosure may be implemented with respect to any network of computing devices that operates to serve streaming content to client computing devices. Moreover, while some examples are provided with respect to specific types of streaming content, such as audio and video, embodiments of the present disclosure may be utilized to control delivery of any content divided into discrete sections that are identified to a user by a manifest. Still further, while some examples are provided with respect to controlling notifications for additional content included within a content stream (e.g., advertisements, disclaimers, credits, etc.), embodiments of the present disclosure may be utilized to provide notifications for any content is included within a content stream, without requiring client computing devices to be aware of such notifications. Thus, the examples provided herein are intended to be illustrative, and not exhaustive, in nature.

As will be appreciated by one of skill in the art in light of the description above, the embodiments disclosed herein substantially increase the ability of computing systems, such as streaming content delivery systems, to deliver content to users in a protected manner, such that client devices are inhibited or prevented from modifying the output of one or more protected portions. Thus, the presently disclosed embodiments represent an improvement in the functioning of such computing systems, by enabling streaming content delivery systems or other networked devices to replicate and reproduce functionality provided by traditional distribution networks, such as television and radio networks. Moreover, the presently disclosed embodiments address technical problems inherent within computing systems; specifically, the limited control that network transmission systems have of data after transmission to a client computing device, and the high potential for client devices to modify that content in an undesirable way. These technical problems are addressed by the various technical solutions described herein, including the use of back-end notifications that occur without requiring client computing devices to be aware of such notifications. Thus, the present disclosure represents a substantial improvement on existing network systems and computing systems in general.

In some instances, embodiments of the present disclosure may utilize additional techniques to inhibit removal or tampering with a content stream. For example, a streaming content delivery system as described in the present disclosure may utilize concealed identifiers within a manifest of streaming content, which inhibit a client computing device from distinguishing between different types of content based on those identifiers. Systems and methods for generating and utilizing concealed identifiers in streaming content are described in more detail within U.S. patent application Ser. No. 15/162,423, filed on May 23, 2016 and entitled "PROTECTING CONTENT-STREAM PORTIONS FROM MODIFICATION OR REMOVAL" (the "'423 application"), the entirety of which is hereby incorporated by reference.

While embodiments of the present disclosure may be described in relation to notifications indicating that individual content portions have been output, this description is not intended to indicate that such notifications may only be transmitted on a complete output of an individual content portion. Rather, in some embodiments, notifications may be transmitted when less than an entire content portion has been output. In one embodiment, a content portion may include one or more identifiers that, when processed by a client computing device, causes the client computing device to transmit information to a streaming content delivery system indicating that the content portion has been output up to a position associated with the identifier. For example, a content portion may include an ID3 formatted tag associated with a specific position within the content portion (e.g., a timestamp), such that when a client computing device outputs the content portion up to that position, the device transmits a notification to a streaming content delivery system that the position within the content portion has been output. In accordance with embodiments of the present disclosure, the streaming content delivery system may then utilize that information, as obtained from a client computing device, to generate and transmit a notification to another party, such as a generator of the content portion.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network environment 100 including multiple client computing devices 102, content providers 104, and advertisement systems 130 in communication with a streaming content delivery system 110 via a network 106. While the client computing devices 102, the content providers 104, and the advertisement systems 130 are shown as grouped within FIG. 1, the client computing devices 102, content providers 104, and advertisement systems 130 may be geographically distant, and independently owned or operated. For example, the client computing devices 102 could represent a multitude of users in various global, continental, or regional locations accessing the streaming content delivery system 110. Further, the content providers 104 could represent a multitude of related or distinct parties that have associated with the streaming content delivery system 110 to provide content, such as web sites, multimedia, or other digital, network-deliverable content to the client computing devices 102. Still further, the advertisement systems 130 could represent a multitude of related or distinct parties provided advertising content to be included within content associated with the content providers (e.g., and providing revenue to the content providers). While shown as distinct, the client computing devices, content providers 104, or advertisement systems 130 may be operated by a common entity, or by a common computing device. Accordingly, the grouping of client computing devices 102, content providers 104, and advertisement system 130 within FIG. 1 is intended to represent a logical, rather than physical, grouping. Similarly, each of the components of the streaming content delivery system 110 may be located within geographically diverse areas. For example, the streaming content delivery system 110 can contain POPs 112 at a variety of globally, continentally, or regionally distinct locations, in order to provide a wide geographical presence for the streaming content delivery system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client computing devices 102, content providers 104, advertisement systems 130, and streaming content delivery system 110 is depicted as having a single connection to the network 106, individual components of the client computing devices 102, content providers 104, advertisement systems 130, and streaming content delivery system 110 may be connected to the network 106 at disparate points. Accordingly, communication times and capabilities may vary between the components of FIG. 1.

Client computing devices 102 may include any number of different computing devices capable of communicating with the streaming content delivery system 110. For example, individual client computing devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include hardware and/or software enabling the reception and output of streaming content, including dedicated playback hardware, dedicated software (e.g., specially programmed applications), and general purpose software (e.g., web browsers) capable of outputting streaming content (e.g., by downloading the content directly, downloading a web page including the content, etc.). In some instances, client computing devices 102 may further be configured to report information regarding output of content to the streaming content delivery system 110, such as whether specific portions of content were output by the client computing device. The specific configuration of individual client computing devices 102 may vary. For example, most client computing devices 102 may retrieve and output streaming content without modification; however, some client computing devices 102 may include hardware or software configured to modify streaming content to remove specific portions (e.g., legal warnings, credits, dedications, advertisements, etc.).

Content providers 104 may include any computing device owned or operated by an entity that provides content to the streaming content delivery system 110 for subsequent transmission to client computing devices (which may include one or more client computing devices 102). For example, content providers 104 may include servers hosting streaming audio, video, text, multimedia, or interactive services (e.g., video games, virtual or augmented reality content, or other immersive content). While illustratively shown in FIG. 1 as a network-attached computing device, content providers 104 may additionally or alternatively provide content to the streaming content delivery system 110 via non-networked communication channels (e.g., via physical delivery of data).

Advertisement systems 130 can include any computing device owned or operated by an entity that provides advertising content to the streaming content delivery system 110 for inclusion within other content (e.g., streaming video). Advertising may include pictures, text, audio, video, or any other content to be inserted within other content types provided by the streaming content delivery system 110. Illustratively, the advertising may be stored by the advertisement systems 130 within the ad content data store 134, which may correspond to any persistent or substantially persistent data storage, such as a hard drive (HDD), a solid state drive (SDD), network attached storage (NAS), a tape drive, or any combination thereof. In some instances, the advertisement systems 130 may be configured to select the specific advertisements to be included within streaming content provided by the streaming content delivery system 110 (e.g., based on attributes of a client computing device 102). Accordingly, the advertisement systems 130 may include an ad selection service 132 configured to receive information regarding content to be streamed to a client computing device 102 (e.g., including attributes of the client computing device 102 itself) and to return a selection of advertising to be included within the streaming content. In one embodiment, the streaming content delivery system 110 and the ad selection service 132 may communicate by use of a standard protocol or specification, such as the Video Ad Serving Template (VAST) specification provided by the INTERACTIVE ADVERTISING BUREAU™ ("IAB"), which enables a streaming content service to transmit information regarding streaming content and to receive, from the advertisement system 130, information regarding what advertising should be played, how the advertising should be played, and notification information for the advertising (e.g., URIs to which requests should be sent as various portions of the advertising is output). The operation of advertisement systems 130, including ad selection services 132, is generally known within the art and thus will not be described in detail herein. While illustrative embodiments are described with regard to distinct advertisement systems 130 that select advertisements for including in content streams, the streaming content delivery system 110 may additionally or alternatively operate without interaction with advertisement systems 130 (e.g., by integrating an ad selection service 132 into the streaming content delivery system 110, by selecting advertising based on a set of rules, by providing static advertising, by integrating non-advertising content as protected content, etc.).

The streaming content delivery system 110 can include a variety of components and devices configured to enable client computing devices 102 to access streaming content provided to the streaming content delivery system 110 by the content providers 104 and the advertisement systems 130. Specifically, the streaming content delivery system 110 can include a number of POPs 112 configured to host streaming content, or act as a caching point for streaming content hosted by the streaming content delivery system 110, the content providers 104, and/or the advertisement systems 130. Each POP 112 may include a variety of computing devices configured to serve content to client computing devices 102. Accordingly, though not shown in FIG. 1, each POP 112 may include any number of processors, data stores, or networking components operating in conjunction to facilitate retrieval and delivery of streaming content to client computing devices. The POPs 112 may communicate with other components of the streaming content delivery system 110 via an internal network of that system 110, which may include any wired network, wireless network, or combination thereof, and may be a personal area network, local area network, wide area network, cable network, satellite network, cellular telephone network, or combination thereof. In some instances, the internal network may be implemented at least in part by the network 106 (e.g., as a virtual private network, or "VPN"). Illustratively, each POP 112 may function to hold a limited selection of content portions within a local cache data store (e.g., the most recently requested n content portions), such that these content portions can be quickly transmitted to client computing devices 102. When the local cache data store does not include a requested content portion, the POP 112 can be configured to retrieve the content portion from a remote data store, such as a content data store 119 of the streaming content delivery system 110, the ad content data store 134, or a data store within a system of a content provider 104 (not show in FIG. 1), and return the content portion to a requesting client computing device 102.

The streaming content delivery system 110 can further include a manifest generation service 114 configured to respond to client requests for streaming content, and to generate a manifest that identifies a number of content portions to be provided to a requesting client computing device 102. As will be described in more detail below, the manifest generation service 114 may interact with other components of the streaming content delivery system 110 as well as external components, such as the advertisement systems 130, to select the specific content portions to be identified within the manifest. The manifest generation system 114 can further communicate with a content generation service 116 to ensure that any custom content portions identified within the manifest are available on the streaming content delivery system 110. Moreover, the manifest generation service 114 can communicate information to other components of the streaming content delivery system 110, such as the monitoring and reporting service 118 and the POPs 112, that enable such components to interact with or process content received from client computing devices. For example, where the manifest generation service 114 generates a manifest including concealed identifiers, as described within the '423 application (incorporated by reference above), the manifest generation service 114 may transmit concealed identifier information to the monitoring and reporting service 118 and the POPs 112, to enable those components to determine underlying (non-concealed) identifiers for each viewed portion. As a further example, the manifest generation service 114 may transmit manifest and reporting information to the monitoring and reporting service 118, which may include identification of what content is referenced within the manifest and what notifications should be sent for such content.

The monitoring and reporting service 118 may include one or more servers configured to process monitoring information regarding output of content on client computing devices, and generate appropriate notifications (if any) for that output of content. Illustratively, the monitoring and reporting service 118 may receive communications from client computing devices 102 indicating what portions of content (e.g., as designated within a manifest file) have been output by the client computing devices 102. Such communications may be generated and transmitted by client computing devices 102 based on executable instructions included, for example, within a player application for the content or within a network-display page (e.g., via client-side scripting). The monitoring and reporting service 118 may determine, for any given content portion output by a client computing device 102, what notifications should be transmitted regarding the content that was output. For example, the monitoring and reporting service 118 may determine that the content output portion corresponds to the first quartile of an advertisement, and that viewing of that first quartile should be reported via a notification to a specific URI. The monitoring and reporting service 118 may then generate and transmit that notification to the URI, in order to inform, for example, an advertisement system 130 that the first quartile was viewed on the client device. In some instances, the monitoring and reporting service 118 may determine notifications that should be transmitted regarding a viewed content portion based on previously generated mapping information. For example, on receiving manifest and reporting information from the manifest generation service 114, the monitoring and reporting service 118 may generate mapping information that associates a given content portion, as referenced in the manifest file, with a corresponding notification. Thus, when information is obtained that the given content portion was viewed, the monitoring and reporting service 118 may reference the mapping information to determine the corresponding notification.

While aspects of the present disclosure are sometimes described with reference to monitoring information obtained from a client computing device 102, monitoring information may additionally or alternatively be obtained from other computing devices, such as those within POPs 112. For example, a POP 112 may report to the monitoring and reporting service 118 that a client computing device 102 requested and obtained a specific content portion from the POP 112. The monitoring and reporting service 118, in turn, may use such a report as an indicator that the client computing device 102 viewed the content portion. While monitoring information received from POPs 112 may lack accuracy when compared to information obtained from client computing device 102 (e.g., because transmission of a content portion may not guarantee that portion's output on a client computing device 102), use of monitoring information received from POPs 112 may reduce or eliminate the need for client computing devices 102 to transmit monitoring information to the monitoring and reporting service 118.

The streaming content delivery system 110 can further include a content generation service 116 configured to generate content portions to be referenced within a manifest, or to join, split, or modify existing content portions such that all content portions align with notifications for corresponding content (e.g., such that portions represent quartiles for which notifications are requested). In some instances, the content generation service 116 may further join, split, or modify existing content portions such that all portions within a manifest share the same or similar attributes (e.g., the same length, resolution, bitrate, frame rate, etc.), which may further inhibit client computing devices 102 from identifying different types of content referenced within a manifest. Illustratively, the content generation service 116 may be configured to receive notifications from the manifest generation service 114 indicating one or more content portions referenced within a manifest and the desired parameters of those content portions (e.g. as selected by the manifest generation service 114 such that the portions align with notification information for underlying content). The content generation service 116 may then re-encode existing content (e.g., existing main content, advertisements, etc.) to conform to those desired parameters. The content generation service 116 may then store the generated portions (e.g., within the content data store 119) to make those portions available to the client computing device 102 that received the concealed manifest, to the POPs 112, or to other components of the streaming content delivery system 110. In some instances, the content generation service 116 can function in a "just-in-time" manner, such that content portions are generated simultaneously with or after delivery of a concealed manifest to a client computing device 102.

The content data store 119, which may be utilized to store the generated content portions as well as other content (e.g., as provided by the content providers 104, the advertisement systems 130, etc.) can correspond to any persistent or substantially persistent data storage, such as a hard drive (HDD), a solid state drive (SDD), network attached storage (NAS), a tape drive, or any combination thereof.

It will be appreciated by those skilled in the art that the streaming content delivery system 110 may have fewer or greater components than are illustrated in FIG. 1. In addition, the streaming content delivery system 110 could include various web services and/or peer-to-peer network configurations. Thus, the depiction of the streaming content delivery system 110 in FIG. 1 should be taken as illustrative. For example, in some embodiments, components of the streaming content delivery system 110, such as the manifest generation service 114 or the content generation service 116, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Figure 2:
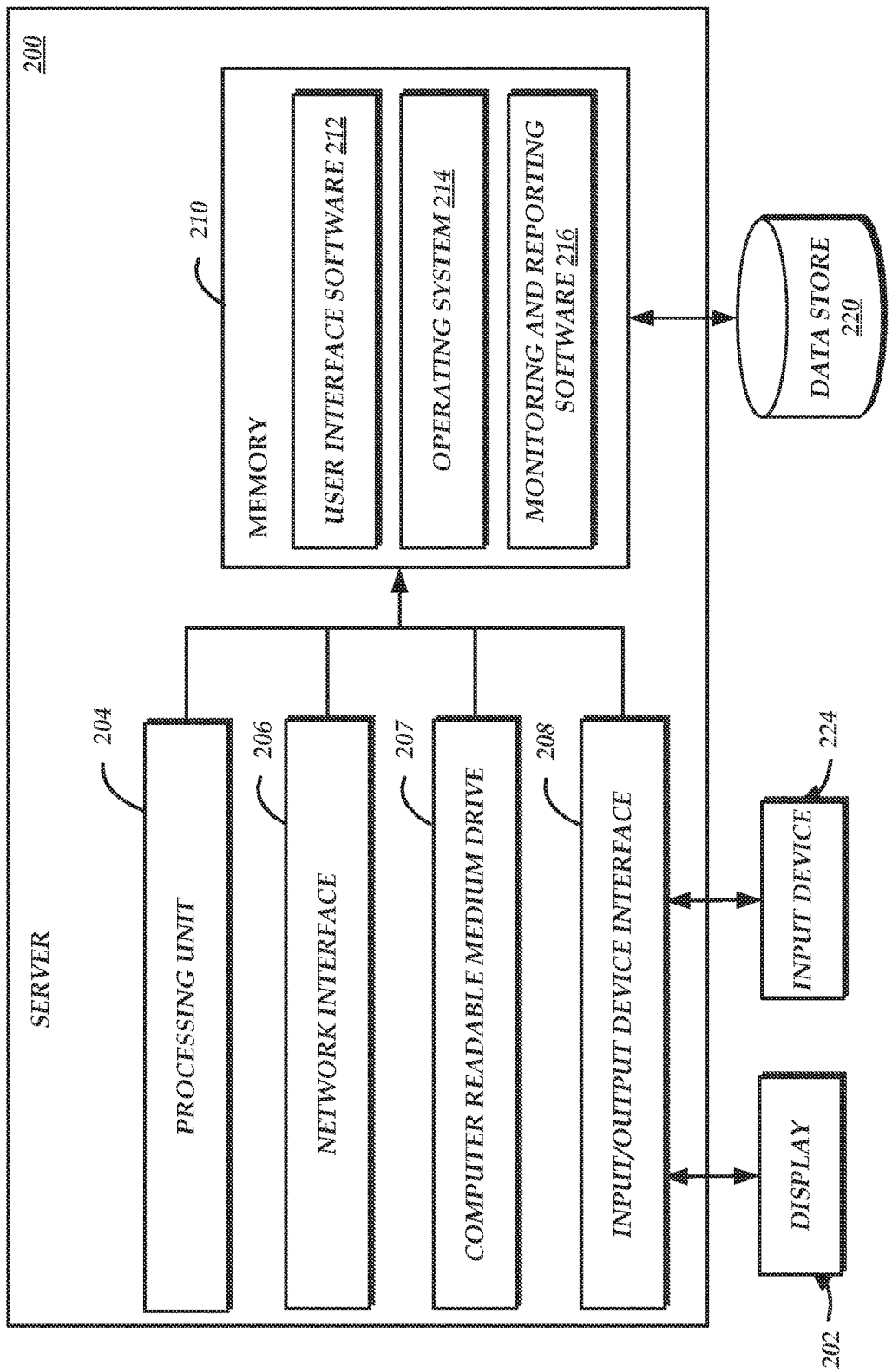
FIG. 2 is a block diagram depicting an illustrative configuration of one embodiment of a server that may implement the monitoring and reporting service within the streaming content delivery system of FIG. 1.

FIG. 2 depicts one embodiment of an architecture of a server 200 that may implement the monitoring and reporting service 118 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 208, a display 202, and an input device 224, all of which may communicate with one another by way of a communication bus. The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 202 via the input/output device interface 208. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes random access memory (RAM), read only memory (ROM) and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 220, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include monitoring and reporting software 216 that may be executed by the processing unit 204. In one embodiment, the monitoring and reporting software 216 implements various aspects of the present disclosure, e.g., generating information associating content portions identified in a manifest file and causing notifications to be transmitted on determining that a client computing device 102 has viewed the portion, processing monitoring information obtained from client computing devices 102 or other devices (e.g., POPs 112) regarding output of content portions, and transmitting notifications regarding those output content portions. While the monitoring and reporting software 216 is shown in FIG. 2 as part of the server 200, in other embodiments, all or a portion of the software may be implemented by alternative computing devices within the streaming content delivery system 110, such as the manifest generation service 114.

Figure 3A:
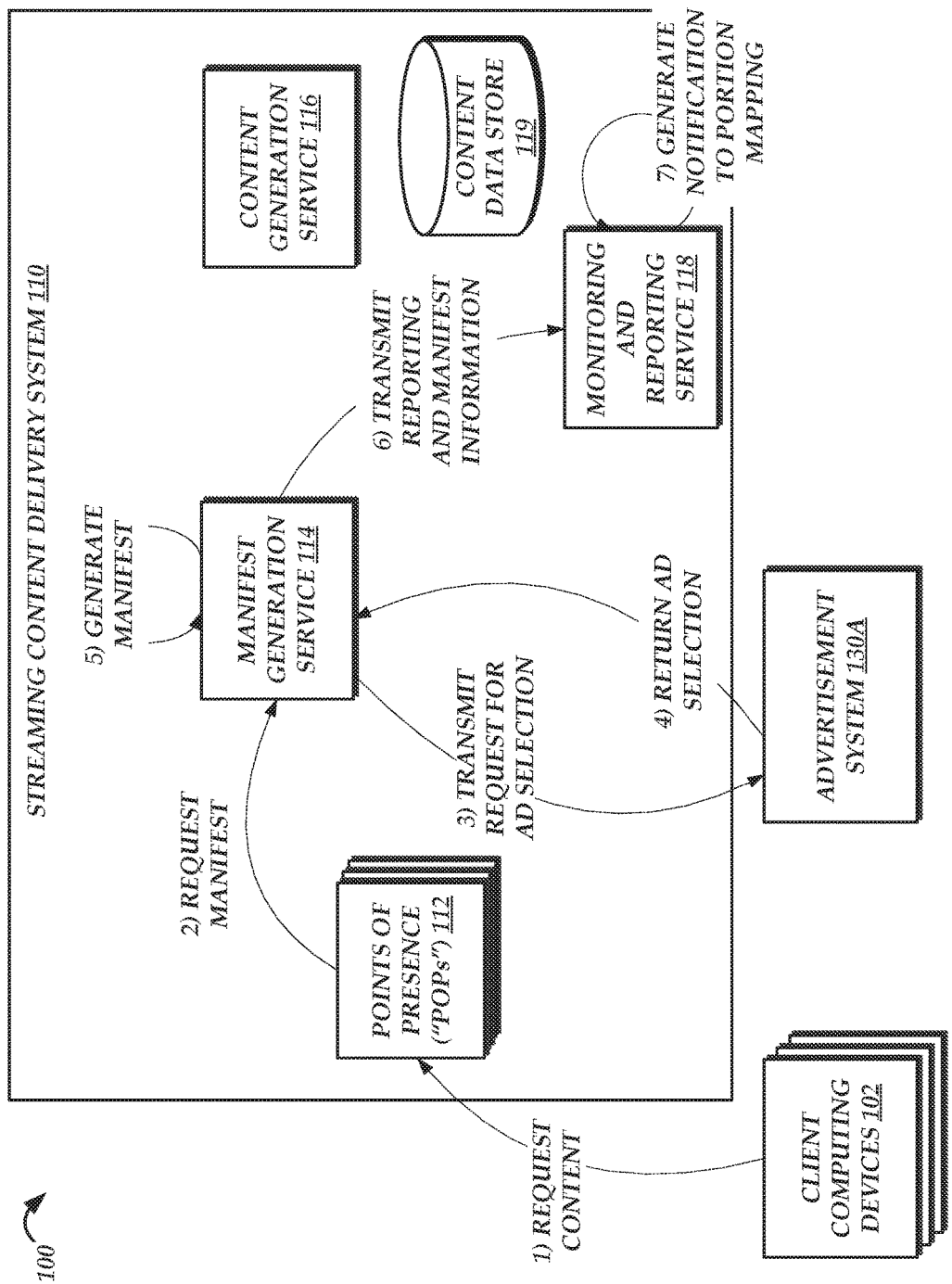
FIGS. 3A and 3B are block diagrams depicting illustrative interactions of the streaming content delivery system of FIG. 1 to generate manifests for clients to view streaming content, and to record reporting and manifest information enabling notifications to providers of the content portions regarding output of the portions on client computing devices.
Figure 3B:
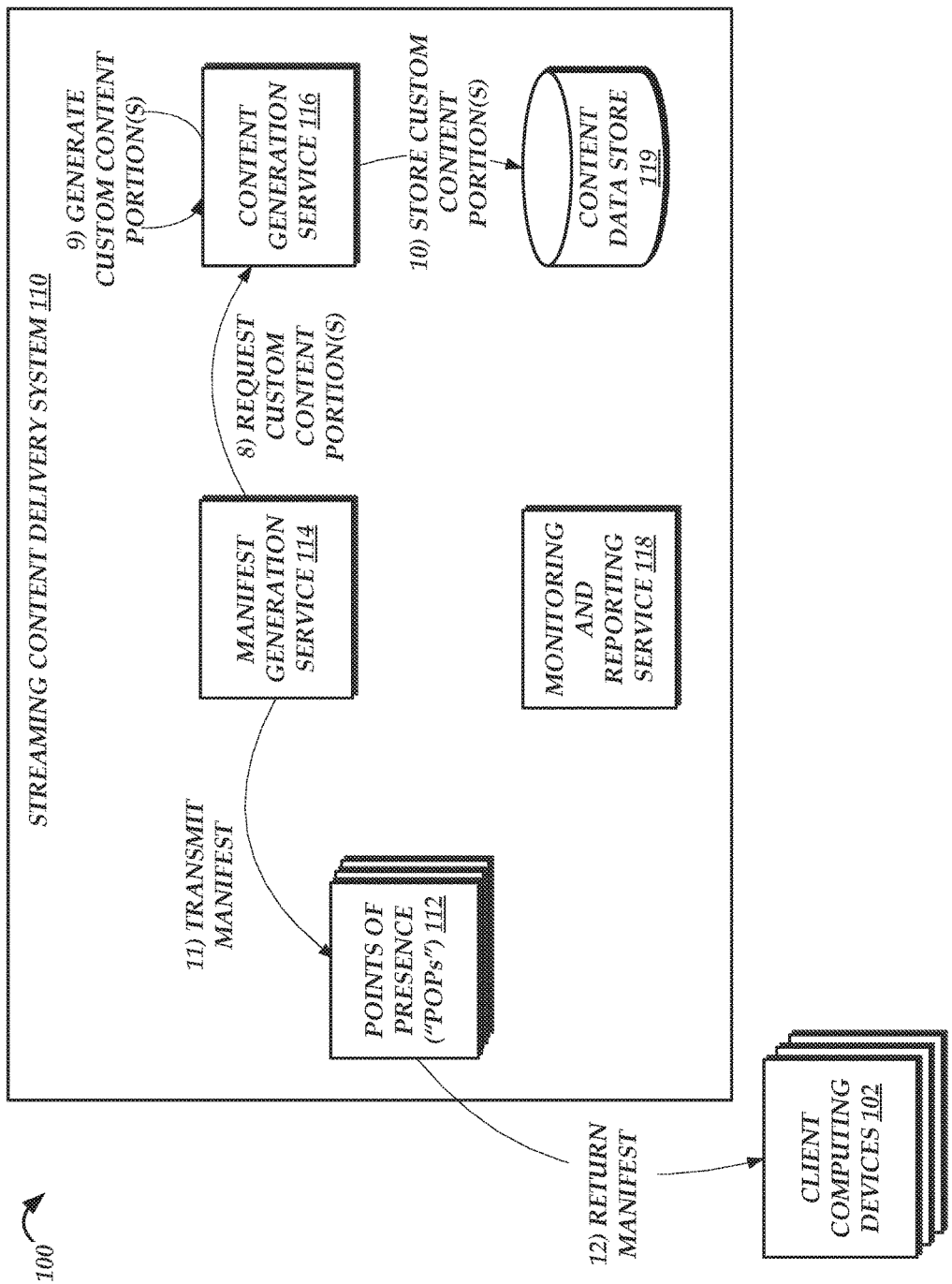

FIGS. 3A and 3B depict a set of illustrative interactions for providing a manifest to a client computing device 102 to enable the device 102 to stream content from the streaming content delivery system 110, and for generating information associating content portions referenced within the manifest to corresponding notifications for such content portions. While shown as two figures, the numbering of interactions between FIGS. 3A and 3B is maintained for consistency.

The interactions begin at (1) of FIG. 3A, where a client computing device 102 requests content from a POP 112 of the streaming content delivery system 110. The request may be generated by a client's use of the client computing device 102, such as by launching or interacting with an application for viewing streaming content, a web browser application, etc. The request can indicate at least a main content desired by the client, such as a television program, movie, video, audio program, etc. In some instances, the request can further indicate information regarding the client computing device 102 or a client utilizing the client computing device 102, such as configuration of the device 102, location of the device 102, an account of the device 102 or the client on the streaming content delivery system 110. As described below, this information may be utilized by the streaming content delivery system 110 and/or an advertisement system 130 to determine additional content to be provided to the client computing device 102, such as legal warnings, credits, dedications, or advertisements, any of which the streaming content delivery system 110 may wish to protect from automatic removal or modification by the client computing device 102.

At (2), the receiving POP 112 requests a manifest from the manifest generation service 114. The manifest can generally correspond to a record of metadata regarding a content stream, such as the format of the stream, as well as a listing of content portions that, when played in sequence, form the content stream. Accordingly, the request transmitted by the POP 112 may include information received from the client computing device 102, such as the main content requested to be streamed, information regarding the client computing device 102, or information regarding a client of the device 102. The request transmitted by the POP 112 may further include additional information obtained by the POP 112, such as a time of day of the request, information associated with an account of the client of the device 102, etc. In some instances, client computing devices 102 may request a manifest directly from the manifest generation service 114, and thus, interaction with a POP 112 may not be required to obtain a manifest for content. In such instances, interactions (1) and (2) may be replaced with a single interaction (e.g., a request from the client computing device 102 for a content stream).

As noted above, in addition to the main content requested by the client computing device 102, streaming content can also include one or more other types of content, such as legal warnings, credits, dedications, or advertisements. This content will generally be described herein as "additional content." In some instances, the manifest generation service 114 itself may determine what additional content is to be included within a content stream. For example, the manifest generation service 114 may include a specific legal warning within all content streams, or may maintain a set of rules that determine what additional content should be provided within a stream (e.g., based on criteria such as the main content requested, attributes of the request, attributes of the client computing device 102, etc.). In other instances, the manifest generation service 114 may interact with other components, such as advertisement system 130A, to determine what additional content to include within the content stream. Because the additional content can be determined at the time that a manifest file is generated, the additional content can be targeted specifically to the client computing device 102 or the client of that device 102. For example, specific advertisements can be included within a content stream that are likely to be relevant to a client. For the purposes of description of FIG. 3A, it will be assumed that the manifest generation service 114 is configured to interact with an advertisement system 130A to determine at least one advertisement to include within a content stream as additional content.

Accordingly, at (3), the manifest generation service 114 transmits a request to the advertisement system 130A for selection of an advertisement to be included within a content stream, and thus identified within a manifest file delivered to the client computing device 102. In one embodiment, the request may be formatted according to the VAST specification, and may include any information regarding the request, such as information regarding the requested main content, attributes of the client computing device 102, attributes of the client of that device 102, etc. In response, at (4), the advertisement system 130A returns an indication of an advertisement to be included in the content stream as additional content, which may also indicate how the advertisement is to be inserted in the main content (e.g., at what times) and what notifications should be transmitted as a client computing device 102 outputs the advertisements. Illustratively, advertisement system 130A may indicate locations within the advertisement that, when viewed by a client computing device 102, should result in a notification to the advertisement system 130A. The advertisement system 130A may further indicate how such notifications should be transmitted, such as via an HTTP notification to a URI defined by the advertisement system 130A. Specific interactions for selection of advertisements by the advertisement system 130A are outside the scope of the present disclosure, and thus will not be discussed in detail.

At (5), the manifest generation service generates a manifest, which identifies content portions corresponding to both the requested main content and any additional content (e.g., the advertisement selected by the advertisement system 130A). Illustratively, in order to generate a manifest, the manifest generation service 114 may first identify what content is to be streamed to the client computing device (e.g., main content and any additional content) and the relative order of that content (e.g., as determined by the information provided by the advertisement system 130A or other information maintained at the manifest generation service 114). The manifest generation service 114 can then determine content portions that, when played in sequence, form the desired content stream. For example, where the manifest generation service 114 determines that a three minute advertisement should be streamed before then streaming a thirty minute television program, the manifest generation service 114 may generate a manifest that identifies content portions forming the three minute advertisement, as well as content portions that form the thirty minute television program. The manifest may also include metadata regarding the stream, such as a format of the content portions, length of each portion, overall duration of the stream, etc. In one embodiment, the manifest is formatted in accordance with the APPLE™ HTTP (hypertext transport protocol) live streaming protocol, or "HLS." In other embodiments, the manifest may be formatted in accordance with other streaming protocols, such as the dynamic adaptive streaming over HTTP ("DASH") protocol, the ADOBE™ HTTP dynamic stream (HDS) protocol, or the MICROSOFT™ smooth streaming (MSS) protocol. Typically, manifests generated according to these protocols include identifiers for each content portion that correspond to actual files on a network-based system. For example, manifests may indicate a URI for each content portion that corresponds to a video file (such as a transport stream, or "ts" file) stored on a network-based storage device. Thus, by downloading and outputting these video files, a client can stream the content identified in the manifest.

In some instances, direct placement of actual identifiers within a manifest can provide an opportunity for client computing devices 102 to selectively modify the manifest to remove unwanted portions, or block downloading or output of specific content portions. Thus, the manifest generation service 114 may, at (5), generate a "concealed" manifest, which identifies content portions by concealed identifiers that prevent or inhibit client computing devices 102 from distinguishing between different types of content, as described within the '423 application (incorporated by reference above).

At (6), the manifest generation service 114 can transmit reporting and manifest information to the monitoring and reporting service 118, enabling the monitoring and reporting service 118 to determine appropriate notifications for the content portions identified within the manifest. Illustratively, the manifest generation service 114 may transmit the manifest itself to the monitoring and reporting service 118, as well as an indication of which content portions within the manifest correspond to which sections of a corresponding content (e.g., content portion A corresponds to timestamps m through n of advertisement X). The manifest generation service 114 may further transmit notification requirements for any content referenced in the manifest, such as the specific URIs to which notifications should be transmitted as portions of a content are output on client computing devices.

In instances where a concealed manifest is utilized, the manifest generation service 114 may further provide the monitoring and reporting service 118 with information enabling the monitoring and reporting service 118 to determine underlying content portions for any concealed identifier.

At (7), the monitoring and reporting service 118 can utilize the received information to generate mapping information between content portions within the manifest and corresponding notifications. Illustratively, the monitoring and reporting service 118 may determine which portions within the manifest file indicate that a specific section of a content has been output on a client computing device 102, and the corresponding notification that should be transmitted after such output occurs.

Figure 5:
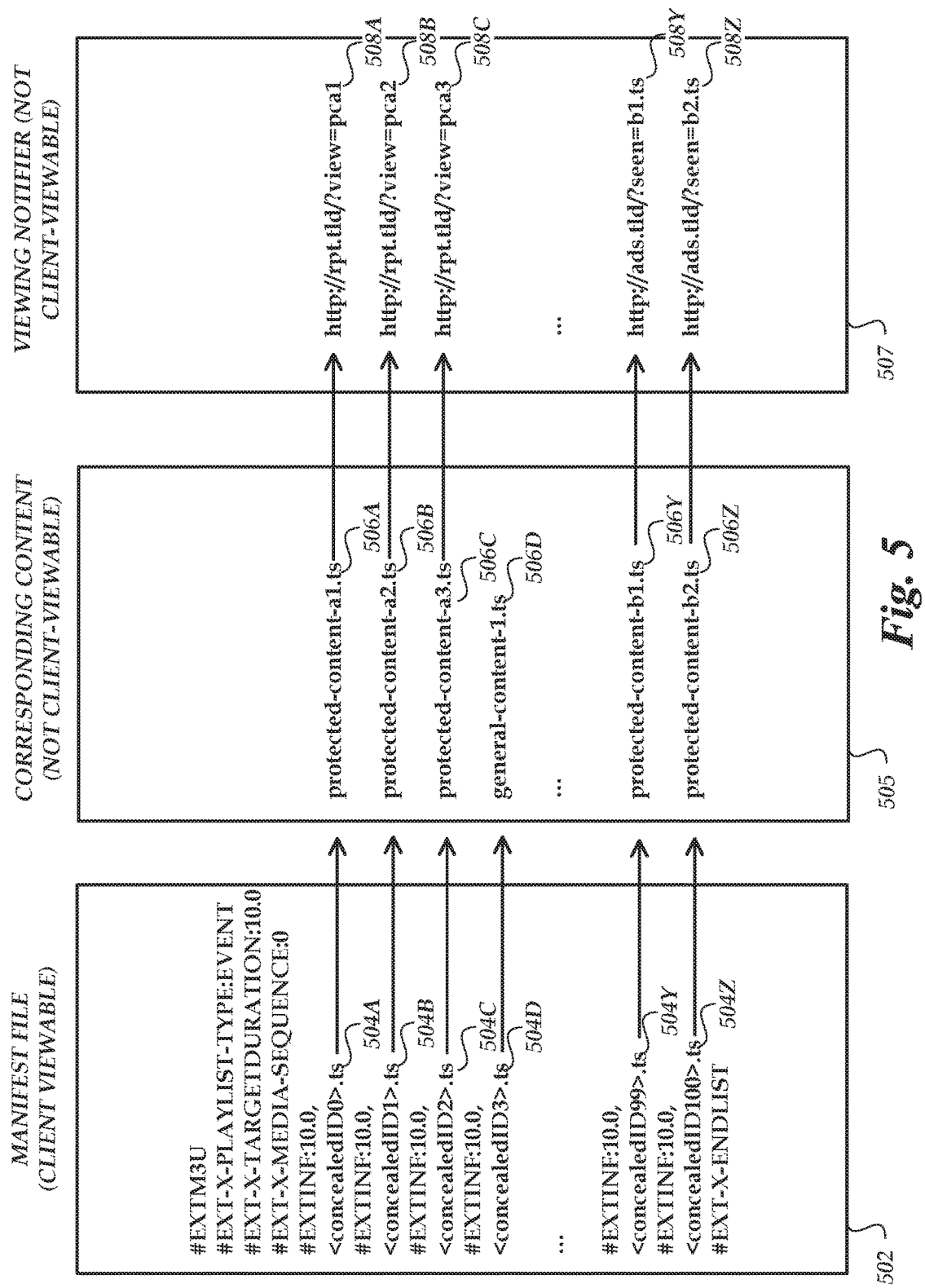
FIG. 5 is an illustrative graphical depiction or visualization of a manifest that may be provided by the streaming content delivery system of FIG. 1, content portions corresponding to portion identifiers indicated within the manifest, and notification information corresponding to the content portions.

By way of illustration, FIG. 5 includes a visualization of a manifest 502 that may be provided to a client computing device 102, corresponding content portions 505, and corresponding viewing notifications 507. As shown in FIG. 5, the manifest 502 identifies a series of content portions (illustratively identified by concealed identifiers 504A-Z, which may be generated in accordance with embodiments of the '423 application incorporated by reference above) that, when viewed, form streaming content. Each concealed identifier 504 corresponds to an actual identifier 506 for a content portion. These actual identifiers may reflect the name or location of a file (on the streaming content delivery system 110 or another network resource, such as the advertising system 130) corresponding to the content portion. While shown in FIG. 5 as simply a file name, identifiers within a manifest file and/or corresponding actual identifiers may in some instances include any portion or all of a URI for a content portion. Because the actual identifiers of each content portion may reveal information regarding that content portion (e.g., the type of content within the content portion), the actual identifiers can be withheld from the client computing device 102 to further inhibit modification or removal of these portions from a content stream.

In addition, one or more content portions, as identified in the manifest 502 and the corresponding listing of content 505, can be associated with a viewing notification, to be made when the client computing device 102 outputs the corresponding portion. For example, as shown in FIG. 5, portions corresponding to actual identifiers 506A-C are associated with viewing notifiers 508A-C, respectively. As a client computing device 102 outputs each portion, the monitoring and reporting service 118 may generate and transmit information, such as an HTTP request, to the corresponding URI of the identifier, to notify the advertisement system 130A that the portion has been output. Accordingly, on receiving manifest and reporting information from the manifest generation service 114, the monitoring and reporting service 118 may generate mapping information, such as that represented by FIG. 5. While the mapping information of FIG. 5 depicts an association between concealed identifiers 504, actual identifiers 506, and notifications 508, the mapping utilized by the monitoring and reporting service 118 may in some instances contain different or alternative information. For example, such mapping information may exclude actual identifiers 506, as such identifiers 506 may be unnecessary once a correspondence is known between a concealed identifier 504A and a corresponding notification 508. In other instances, mapping information may exclude concealed identifiers 504, such as in instances where concealed identifiers 504 are not used, or when content output information is obtained from POPs 112 that have knowledge of the actual identifiers 504 for a given content portion. In general, any mapping information may be used that indicates correspondences between monitoring information regarding output of content portions on a client computing device 102 and notifications to be transmitted in response to such output. While the viewing notifiers 508 are illustratively shown as URIs, other viewing notifiers may be utilized. For example, a monitoring and reporting service 118 may transmit notifications to a dedicated endpoint of the advertisement system 130A, and such notifications may include information sufficient to denote which sections of additional content have been output by client computing devices 102.

As noted above, while embodiments of the present disclosure may enable the generation of notifications based on determining that individual content portions have been completely output, notifications may also be generated based on obtained information indicating that less than an entire content portion has been output. For example, a content portion may include one or more identifiers, such as ID3 tags, that, when processed by a client computing device 102, causes the client computing device 102 to transmit information to the streaming content delivery system 110 indicating that the content portion has been output up to a position associated with the identifier. Thus, the mapping displayed in FIG. 5 may be modified to associate these ID3 tags (or the information obtained from a client computing device 102 in response to processing an ID3 tag) with corresponding viewing notifiers. Accordingly, when the streaming content delivery system 110 obtains information from the client computing device 102 indicating that the device 102 has reached a point within a content portion corresponding to a given ID3 tag (e.g., tag identifier X), the streaming content delivery system 110 may determine a viewing notifier associated with that given ID3 tag and generate a corresponding notification.

Returning to the interactions of FIG. 3B, after generating a manifest (e.g., corresponding to the example manifest 502 of FIG. 5), the manifest generation service 114 can interact with the content generation service 116 to ensure that any content portions referenced within the manifest are available for transmission to a client computing device 102. As discussed above, the streaming content delivery system 110 may in some instances be configured to generate content portions "on-the-fly," in response to a client computing device 102's request to stream content. In some instances, these content portions may be generated to align with notifications for the content. For example, where an advertisement system 130A requests notifications be transmitted as a client computing device 102 outputs specific percentages (e.g., quartiles) of an advertisement, the streaming content delivery system 110 may generate content portions that represent such percentages (e.g., such that an endpoint of a content portion matches a time within the advertisement indicated by a percentage), such that notifications can be transmitted after determining that the client computing device 102 has output a respective content portion. In some instances, the manifest generation service 114 may reference these content portions in a manifest, even before the content portions have been generated by the streaming content delivery system 110. For example, the manifest generation service 114 may determine, based on an advertisement and associated notification information, that the advertisements should be broken into a specific set of content portions. Thereafter, the manifest generation service 114 may, at (8), instruct the content generation service 116 to generate the specific set of content portions (e.g., according to parameters provided by the manifest generation service 114).

At (9), the content generation service 116 can utilize information of the request to generate custom content portions. Illustratively, the content generation service 116 may retrieve each desired content (e.g., advertisements, main content, etc.) and re-encode that desired content to form the requested custom content portions. Thereafter, at (10), the content generation service 116 stores the custom content portions into the content data store 119 for later retrieval by the POPs 112 and transmission to the client computing devices 102, as described in more detail below with reference to FIG. 4A.

In addition, at (11), the manifest generation service 114 returns the concealed manifest to a POP 112. At (12), the POP 112 returns the concealed manifest to the client computing device 102, enabling the client computing device 102 to stream the content identified within the manifest, while inhibiting or preventing the client computing device 102 from distinguishing between the different types of content identified within the manifest based on the notification information provided therein. As noted above, in some instances, client computing devices 102 may request a manifest directly from the manifest generation service 114, and thus, interaction with a POP 112 may not be required to obtain a manifest for content. Accordingly, interactions (11) and (12) may be replaced with a single interaction (e.g., transmission of a manifest from the manifest generation service 114 to the client computing device 102).

While the interactions of FIGS. 3A and 3B are described above sequentially, it is contemplated that some or all of the interactions may repeatedly occur, and that these interactions may occur at least in part concurrently. For example, the manifest generation service 114 may concurrently or simultaneously transmit a manifest to a POP 112 and request that content portions within the manifest be created. As a further example, the streaming content delivery system 110 may be configured to deliver multiple manifests for a given item of streaming content, or to deliver a single manifest as multiple transmissions over time. Thus, prior to each point in which a new manifest or section of a manifest is transmitted to the client computing device 102, the manifest generation service 114 may determine a new set of content portions to be identified within the new manifest or section. In some instances, the new set of portions may vary based on monitored information regarding the streaming content (e.g., as obtained from the monitoring service 118). For example, where monitoring information indicates that a client computing device 102 did not output a protected portion (or, potentially, that the protected portion was never requested by the client computing device 102), the manifest generation service 114 may identify the protected portion (or another additional content portion) in a new manifest or manifest section. Thus, where a user "skips" over a protected portion (e.g., an advertisement) in an effort not to view the portion, a new advertisement or protected portion may be identified in the manifest. In some instances, new manifests may identify only protected content (e.g., and not other content, such as main content) until a client computing device 102 outputs the protected content, at which point additional manifests (or manifest sections) can be provided including non-protected content.

Moreover, while the interactions of FIGS. 3A and 3B are described with respect to a single series of content portions, embodiments of the present disclosure may enable the use of alternative series of content portions, each of which form a different version of streaming content. For example, a first series of content portions may present streaming content at a first quality level, a second series at a second quality level, etc. The various series may be identified in a single manifest or multiple manifests provided to the client computing device 102. In some instances, the client computing device 102 may switch between outputting content portions of different series to account for the state of the device 102 (e.g., to account for slow communications between the device 102 and the streaming content delivery system 110).

Figure 4A:
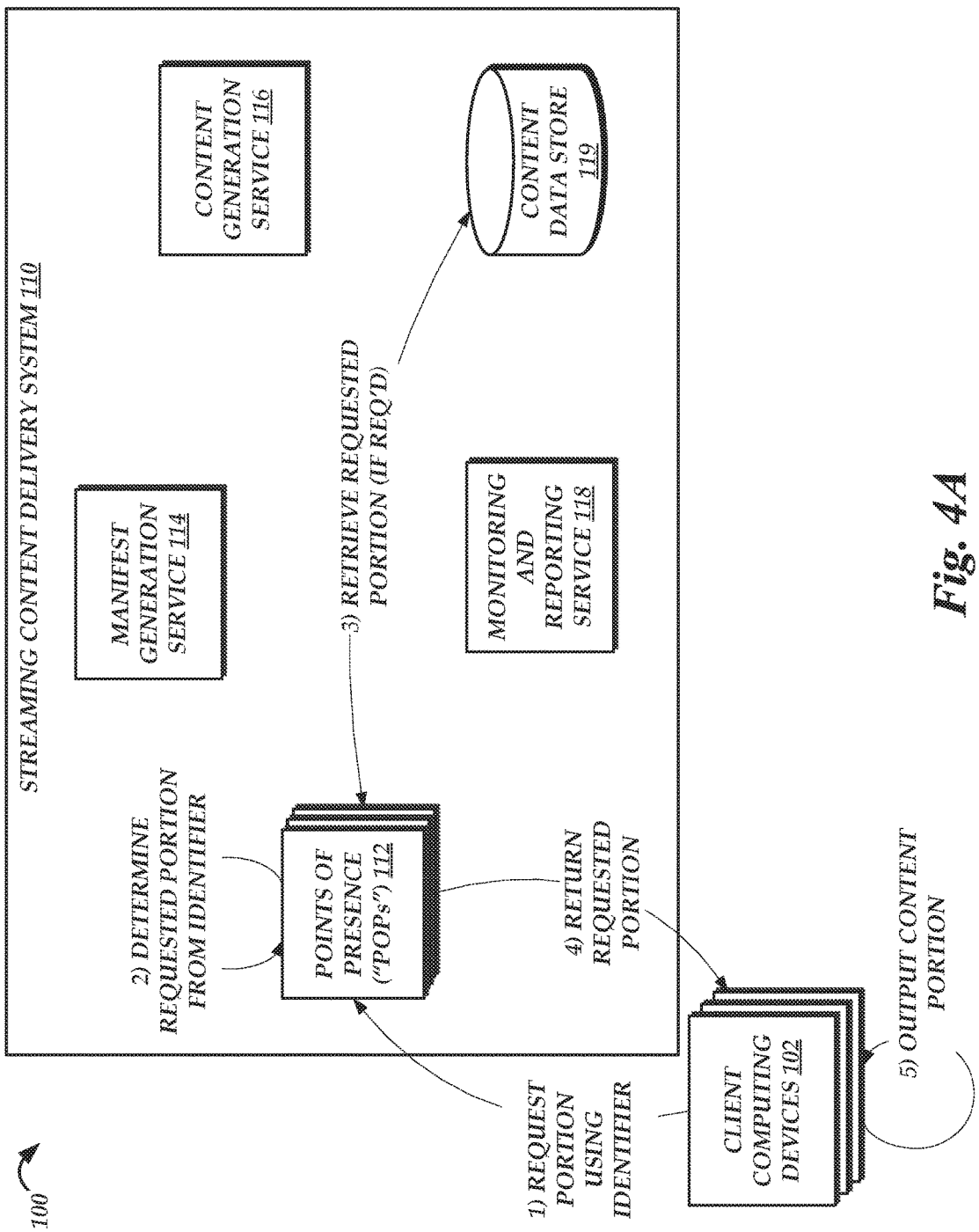
FIGS. 4A and 4B are block diagrams depicting illustrative interactions of the streaming content delivery system of FIG. 1 to provide content to a client computing device, process monitoring information regarding portions of the content, and notify providers of the portions regarding output of the portions on client computing devices.
Figure 4B:
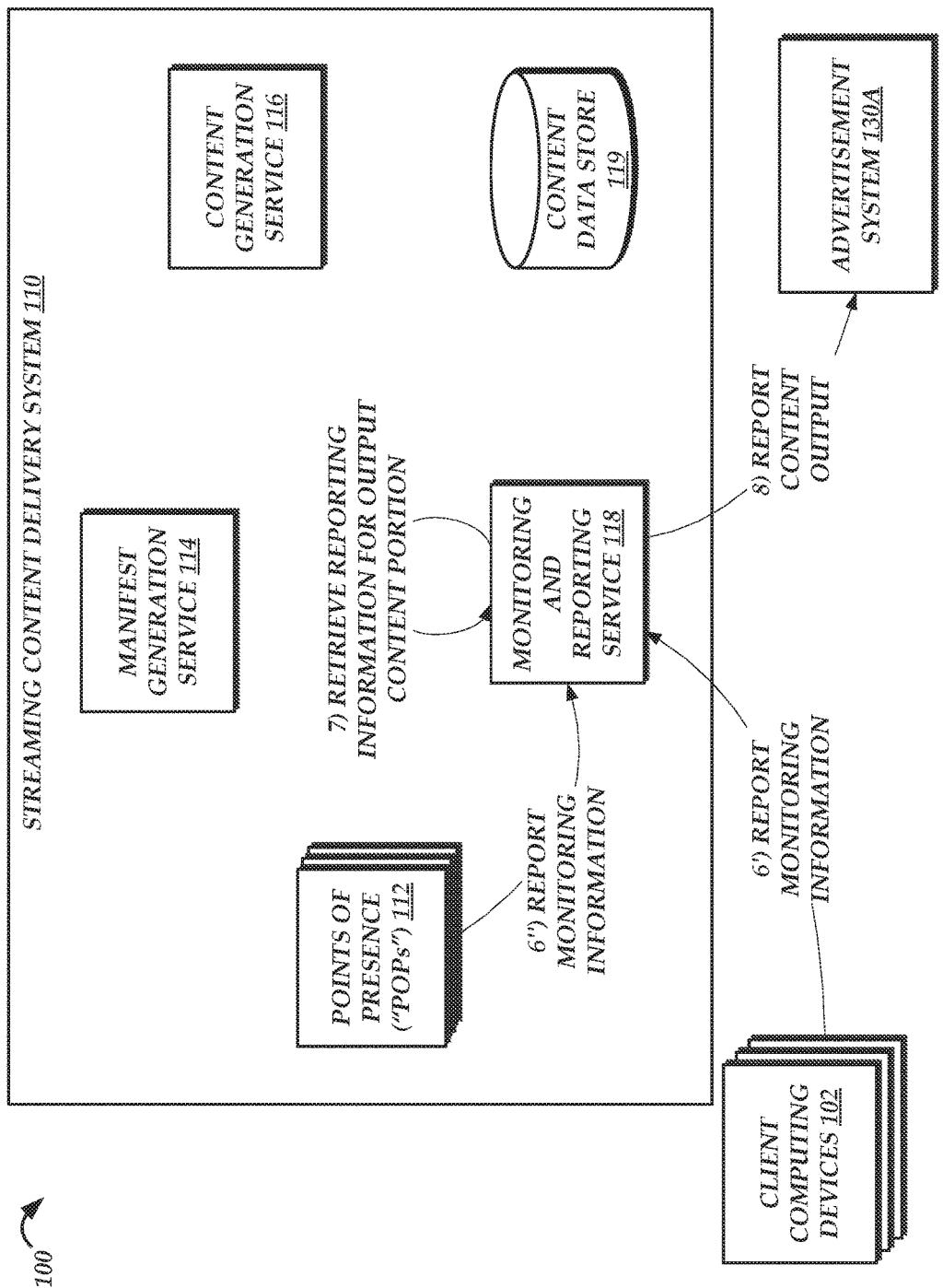

With reference to FIGS. 4A and 4B, a set of illustrative interactions are depicted for enabling a client device 102 to view streaming content based on a manifest file, and for transmitting notifications based on that viewed content. Specifically, FIG. 4A depicts a set of illustrative interactions for enabling a client computing device 102 to view streaming content based on portions referenced within a manifest file, while FIG. 4B depicts illustrative interactions for generating notifications, at the monitoring and reporting service 118, based on viewing of those portions.

The interactions of FIG. 4A begin at (1), where a client computing device 102 requests a content portion from a POP 112 of the streaming content delivery system 110, using an identifier for the portion included within a manifest. The identifier may, for example, be a concealed identifier generated in accordance with embodiments of the '423 application, incorporated by reference above. The request may be automatically generated by the client computing device 102 (e.g., by a web browser or other application) based on processing the manifest previously obtained from the streaming content delivery system 110. On receiving the request, the POP 112, at (2) determines the requested portion based on the identifier. Illustratively, where concealed identifiers are used that are generated by encrypting an actual identifier with an encryption key, the POP 112 may utilize that key to decrypt the concealed identifier, and thus determine an actual identifier of the requested portion. Where concealed identifiers are used that are generated using other conversions (e.g., random assignment), the POP 112 may utilize information provided by the manifest generation system 114, such as a mapping of concealed identifiers to actual identifiers, to determine which actual identifier corresponds to the requested portion. Where concealed identifiers are not used, the POP 112 may directly identify a requested content portion from the identifier provided by a client computing device 102 (e.g., an actual identifier of the requested portion).

At (3), the POP 112 retrieves the requested portion from the content data store 119, if required. Illustratively, retrieval of the content portion may only be required if the content portion is not previously stored at a cache of the POP 112. In the instance that the content portion is stored at the POP 112, interaction (3) may not be required. While retrieval of a content portion is shown with respect to the content data store 119, POPs 112 may additionally or alternatively retrieve content from other data sources, such as the advertisement systems 130 (not shown in FIG. 4).

After obtaining the requested content portion, at (4), the POP 112 returns the content portion to the client computing device 102, which may output the content portion at (5). Thus, at (5), the client computing device 102 is enabled to output the portion as part of streaming content corresponding to the manifest file.

The interactions of FIG. 4A are continued in FIG. 4B, which depicts additional interactions enabling viewing notifications for content to be transmitted based on determinations that a client computing device 102 has output a content portion for which a notification has been requested. The interactions of FIG. 4B begin at (6), where either or both of the client computing devices 102 and the POPs 112 report monitoring information to the monitoring and reporting service 118. Illustratively, a client computing device 102 may generate monitoring information by execution of code on the client computing device 102 that is included within or forms part of a player application through which the streaming content is viewed. Additionally or alternatively, the client computing device 102 may generate monitoring information by execution of client-side scripting code provided the streaming content delivery system 110 (e.g., within a hypertext markup language ("HTML") page or other network-transmitted display page, such as a page rendered within a web browser application executed on the client computing device). The reporting information transmitted by the client computing device 102 may include, for example, an indication that a content portion included within a manifest file was output by the client computing device 102, or an indication that a specific position within a content file (e.g., associated with an ID3 tag) has been reached by the client computing device 102. With respect to monitoring information reported by a POP 112, the monitoring information may include an indication that a content portion was transmitted to a client computing device 102. While transmission of a content portion may not guarantee output of the portion on the client computing device 102, the monitoring and reporting service 118 may use an indication that a content portion was transmitted to the client computing device 102 to determine that the content portion was output on the client computing device 102, particularly in the absence of monitoring information obtained from the client computing device 102 itself.

At (7), the monitoring and reporting service 118 retrieves reporting information for the output content portion. Illustratively, the monitoring and reporting service 118 may use a previously generated mapping (such as that generated at interaction (7) of FIG. 3A) to determine a viewing notification to be sent in response to output of a content portion. In another embodiment, the monitoring and reporting service 118 may determine a notification to be sent in response to output of a content portion without reference to a previously generated mapping, by determining a section of a content to which the output content portion corresponds, and retrieve notification information for that section of content. For example, the monitoring and reporting service 118 may determine that a viewed content portion corresponds to the first 15 seconds of a one minute advertisement, and may further determine that a notification was requested by a provider of the advertisement when a client computing device 102 has output each 15 second quartile of the advertisement. In the instance that concealed identifiers are included within a manifest file, and that the reporting information indicates viewing of content portions by reference to such identifiers, the monitoring and reporting service 118 may translate the concealed identifiers to actual identifiers (or to other identifying information) of the content portions, as described in the '423 application incorporated by reference above. In embodiments where concealed identifiers are used, the monitoring information received from the POPs 112 may also include such concealed identifiers, and may be handled similarly. Alternatively, the monitoring information received from the POPs 112 may include actual identifiers (or other identifying information), given that the POPs 112 may be enabled to translate concealed identifiers to actual identifiers in accordance with embodiments of the '423 application.

At (8), the monitoring and reporting service 118 transmits notifications, if any, corresponding to the content portions output at the client computing devices 102. In the example of FIG. 4B, it is assumed that such a notification is transmitted to the advertisement system 130A (e.g., via a URI specified within the VAST response that initially identified the advertisement for inclusion in the content stream). However, notifications may be transmitted to any network-accessible computing device, such as a dedicated endpoint for notifications. In some instances, output of a content portion may not require transmission of notifications (e.g., where a provider of the content within the content portion has not requested viewing notifications), and thus, interaction (8) would not occur with respect to those content portions.

While the interactions of FIGS. 4A and 4B are described with respect to a single content portion, these interactions may be repeated for multiple content portions. In some instances, interactions regarding distinct content portions may occur at least partly concurrently. For example, a client computing device 102 may report monitoring information for a first portion while simultaneously downloading a second portion. As another example, a POP 112 may transmit monitoring information for multiple content portions, delivered to one or more client computing devices 102. As such, processing of monitoring information from a POP 112 at a monitoring and reporting service 118 results in transmission of multiple viewing notifications from the monitoring and reporting service 118. In instances where the monitoring and reporting service 118 utilizes monitoring information from both POPs 112 and client computing devices 102, the monitoring and reporting service 118 may establish threshold time periods for transmitting viewing notifications, such that monitoring information received from a first element (e.g., a POP 112 or a client computing device 102) results in transmission of a viewing notification after the threshold time period, unless contrary information is obtained from a second element. In other embodiments, monitoring information received from a single element may be sufficient to cause transmission of an appropriate viewing notification.

Figure 6:
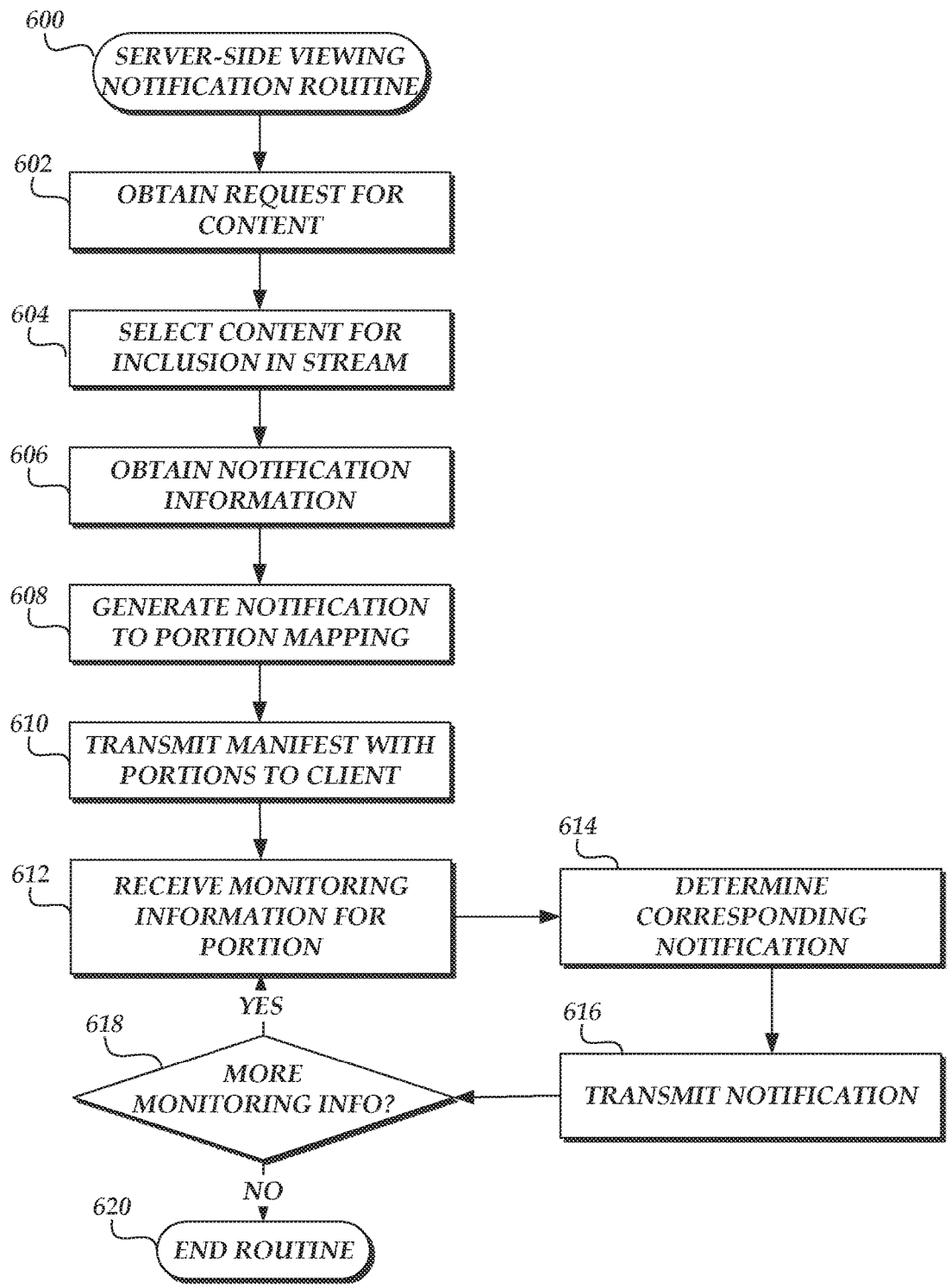
FIG. 6 is a flow chart depicting an illustrative routine for utilizing client monitoring information regarding output of content portions to generate notifications to providers associated with the content portions.

With reference to FIG. 6, one illustrative routine 600 for providing streaming content and generating notifications for viewed content is depicted. The routine 600 may be carried out, for example, by the content delivery system 110 of FIG. 1. The routine 600 begins at block 602, where the content delivery system 110 obtains a request for streaming content from a client computing device 102. The request may be generated by a client's use of the client computing device 102, such as by launching or interacting with an application for viewing streaming content, a web browser application, etc. The request can indicate at least a main content desired by the client, such as a television program, movie, video, audio program, etc. In some instances, the request can further indicate information regarding the client computing device 102 or a client utilizing the client computing device 102, such as configuration of the device 102, location of the device 102, an account of the device 102 or the client on the streaming content delivery system 110.

At block 604, the streaming content delivery system 110 selects content to be included in a content stream. Illustratively, the selected content can include main content (e.g., that requested by the client computing device 102) as well as additional content (e.g., legal disclaimers, advertisements, etc.). In some instances, the streaming content delivery system 110 may determine additional content by interaction with third party external systems, such as advertisement systems 130. Further, the streaming content delivery system 110 may determine the content for inclusion based on information regarding the client computing device 102.

At block 606, the streaming content delivery system 110 obtains notification information for the content to be included in the stream. The notification information may be specified, for example, by a provider of the various contents included in the stream. Illustratively, a provider of a main content may request, at the time of providing the main content to the streaming content delivery system 110, that various notifications be provided in response to output of the main content on a client computing device. As a further illustration, an advertiser may include notification information for an advertisement within a VAST response transmitted to the streaming content delivery system 110 during selection of the content to be included within the stream.

At block 608, the streaming content delivery system 110 generates a mapping of content portions and corresponding notifications. Illustratively, the streaming content delivery system 110 may determine a content portion, referenced within a manifest for a content stream, that corresponds to a given segment of a content for which a notification was requested. The streaming content delivery system 110 may then generate a mapping between the content portion and the notification, such that when a client computing device is determined to have output the content portion, a corresponding notification is transmitted. The mapping may be stored for later reference, as monitoring information is received regarding output of content portions on client computing devices.

At block 610, the streaming content delivery system 110 transmits a manifest to the client computing device, including references to the content portions that collectively form a content stream. Illustratively, the manifest may include an arrangement of files, such as transport stream files, each of which corresponding to a content selected for inclusion in the stream (e.g., main content, legal warnings, disclaimers, ad content, etc.). Thus, the client computing device may utilize the manifest file to view a content stream.

At block 612, the streaming content delivery system 110 obtains monitoring information regarding output of content portions on a client computing device. As noted above, monitoring information may be received from client computing devices, POPs (or other network-delivery systems), or both. The monitoring information may indicate, for example, one or more content portions output by (or transmitted to, which may be used as an indication of output by) a client computing device, or that a specific position within a content portion (e.g., as indicated by an ID3 tag or other metadata included within or associated with the content portion) has been reached by the client computing device.

At block 614, the streaming content delivery system 110 determines, from the generated mapping information, a notification to be transmitted in response to output of the content portion. Illustratively, the notification may include transmission of network data (e.g., an HTTP request) to an endpoint, which may be specified by a provider of the content for which a notification is requested. At block 616, the streaming content delivery system 110 transmits the notification to a destination computing device (e.g., a static destination or an endpoint specified by a provider of the content). Thus, the provider of the content (or any other entity) can be notified regarding output of content on a client computing device, without providing the client computing device with information that may be used to selectively filter content from content stream.

The routine 600 may then continue to block 618, where the routine 600 varies according to whether additional monitoring information is received (e.g., noting output of different content portions on a client computing device). If so, the routine 600 returns to block 612 and continues as described above. Otherwise, the routine 600 ends at block 620.

While the routine 600 is described sequentially, implementation of various blocks of the routine 600 may occur at least in part concurrently, and may be achieved by different components within the streaming content delivery system 110. For example, the streaming content delivery system 110 may utilize a manifest generation service to implement some portion of the routine 600 (e.g., blocks 602, 604, and 610) and a monitoring and reporting service to implement other portions of the routine 600 (e.g., blocks 606, 608, and 612-616). Functionalities of the routine 600 may further be implemented, in part or in whole, on POPs (e.g., within a content delivery network).

While the embodiments described herein generally determine notifications to be transmitted in response to output of content portions at the time that a manifest (or section of a manifest) is created, other embodiments are contemplated within the scope of the present disclosure. Accordingly, in some instances the streaming content delivery system 110 may determine notifications for a given content portion on an ad hoc basis, in response to a notification that the portion has been output by a client computing device.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing streaming content in a manner that prevents portions of the streaming content from being blocked or removed, the system comprising:
    a data store including:
        a first set of content portions corresponding to a main content; and
        a second set of content portions corresponding to an additional content; and
    one or more computing devices configured with computer-executable instructions that, when executed, cause the computing devices to:
        obtain a request from a client computing device to provide a content stream including the main content;
        determine that the additional content is to be included in the content stream;
        determine notification information for the additional content, wherein the notification information indicates at least one notification requested to be transmitted to a provider of the additional content, the at least one notification indicating to the provider of the additional content that the client computing device has rendered the additional content on a display of the client computing device;
        generate a manifest for the content stream, wherein the manifest includes a set of identifiers including identifiers for the first set of content portions and for the second set of content portions;
        generate mapping information associating at least a first content portion, of the second set of content portions, and the notification requested by the provider of the additional content;
        obtain monitoring information indicating that the client computing device has rendered the first content portion on the display of the client computing device;
        identify, from the mapping information, the notification requested by the provider of the additional content; and
        transmit the notification to the provider as an indication that the client computing device has rendered the additional content on the display of the client computing device.

2. The system of claim 1, wherein the main content is at least one of audio, video, or textual content.

3. The system of claim 1, wherein the additional content is at least one of a disclaimer, a warning, credits, a dedication, or an advertisement.

4. The system of claim 1, wherein the one or more computing devices are configured with the computer-executable instructions to determine that the additional content is to be included in the streaming content at least partly by:
    transmitting a request to a system associated with the provider of the additional content to select the additional content for inclusion in the content stream; and
    obtaining a response identifying the additional content for inclusion in the content stream.

5. The system of claim 4, wherein the response identifying the additional content for inclusion in the content stream further indicates the notification information for the additional content.

6. The system of claim 4, wherein the response is formatted according to the video ad serving template (VAST) specification.

7. A computer-implemented method comprising:
    obtaining a request from a client computing device to provide a content stream;
    determining that a first content is to be included in the content stream;
    determining notification information for the first content, wherein the notification information indicates at least one notification requested to be transmitted to a destination network device, the at least one notification indicating to the destination network device that the client computing device has rendered the first content on a display of the client computing device;
    generating a manifest for the content stream, wherein the manifest identifies a plurality of content portions to be included in the content stream, the plurality of content portions including at least one portion corresponding to the first content;
    generating mapping information associating the at least one portion and the notification requested to be transmitted to the destination network device;
    obtaining monitoring information indicating that the client computing device has rendered the at least one portion on the display of the client computing device;
    identifying, from the mapping information, the notification requested to be transmitted to the destination network device; and
    transmitting the notification to the destination network device as an indication that the client computing device has rendered the first content on the display of the client computing device.

8. The computer-implemented method of claim 7, wherein the notification information for the first content identifies the destination network device via a uniform resource indicator (URI).

9. The computer-implemented method of claim 7 further comprising generating the at least one portion.

10. The computer-implemented method of claim 9, wherein the at least one portion is generated subsequent to generating the manifest that identifies the at least one portion.

11. The computer-implemented method of claim 9, wherein generating the at least one portion comprises determining a section of the first content to be included in the at least one portion, and wherein the section is determined based at least in part on the notification information.

12. The computer-implemented method of claim 11, wherein the notification indicates a point within the first content at which the at least one notification is requested to be transmitted, and wherein determining the section based at least in part on the notification information comprises determining the section to align an endpoint of the section to the point within the first content.

13. Non-transitory computer-readable storage media including executable instructions that, when executed by a computing system, cause the computing system to:
    obtain a request from a client computing device to provide a content stream;

determine a first content to be included in the content stream;

obtain notification information for the first content, wherein the notification information indicates at least one notification requested to be transmitted to a destination network device, the at least one notification indicating to the destination network device that the client computing device has rendered the first content on a display of the client computing device;

obtain information identifying a content portion, of a plurality of content portions to be included in the content stream, that corresponds to the first content;

receive monitoring information indicating the client computing device has rendered the content portion on the display of the client computing device; and transmit, based at least in part on receiving the monitoring information, the notification to the destination network device as an indication that the client computing device has rendered the first content on the display of the client computing device.

14. The non-transitory computer-readable storage media of claim 13, wherein the content stream is formatted according to at least one of hypertext transport protocol (HTTP) live streaming protocol (HLS), dynamic adaptive streaming over HTTP (DASH), MICROSOFT smooth streaming (MSS) protocol, or HTTP dynamic stream (HDS) protocol.

15. The non-transitory computer-readable storage media of claim 13, wherein the executable instructions cause the computing system to determine the first content to be included in the content stream at least partly by:

transmitting a request to a system associated with a provider of the first content to select the first content for inclusion in the content stream; and obtaining a response identifying the first content for inclusion in the content stream.

16. The non-transitory computer-readable storage media of claim 13, wherein the executable instructions cause the computing system to obtain information identifying the content portion that corresponds to the first content at least partly by generating a manifest for the content stream, wherein the manifest references the plurality of content portions to be included in the content stream.

17. The non-transitory computer-readable storage media of claim 16, wherein generating the manifest for the content stream comprises selecting concealed identifiers for individual content portions of the plurality of content portions, wherein the manifest refers to the plurality of content portions by reference to the concealed identifiers.

18. The non-transitory computer-readable storage media of claim 16, wherein the executable instructions cause the computing system to receive monitoring information indicating that the client computing device has rendered the content portion on the display of the client computing device at least partly by determining a correspondence between the content portion and a concealed identifier used to refer to the content portion in the manifest.

19. The non-transitory computer-readable storage media of claim 13, wherein at least one notification is requested to be transmitted to the destination network device when the client computing device reaches a specified point within the first content, wherein the specified point within the first content corresponds to a tag within the content portion that corresponds to the first content, and wherein the monitoring information is received from the client computing device in response to processing the tag.

* * * * *